May 12, 1959
T. GITTINGER ET AL
2,886,132
BEARING GREASER ASSEMBLY
Filed Dec. 13, 1956
2 Sheets-Sheet 2
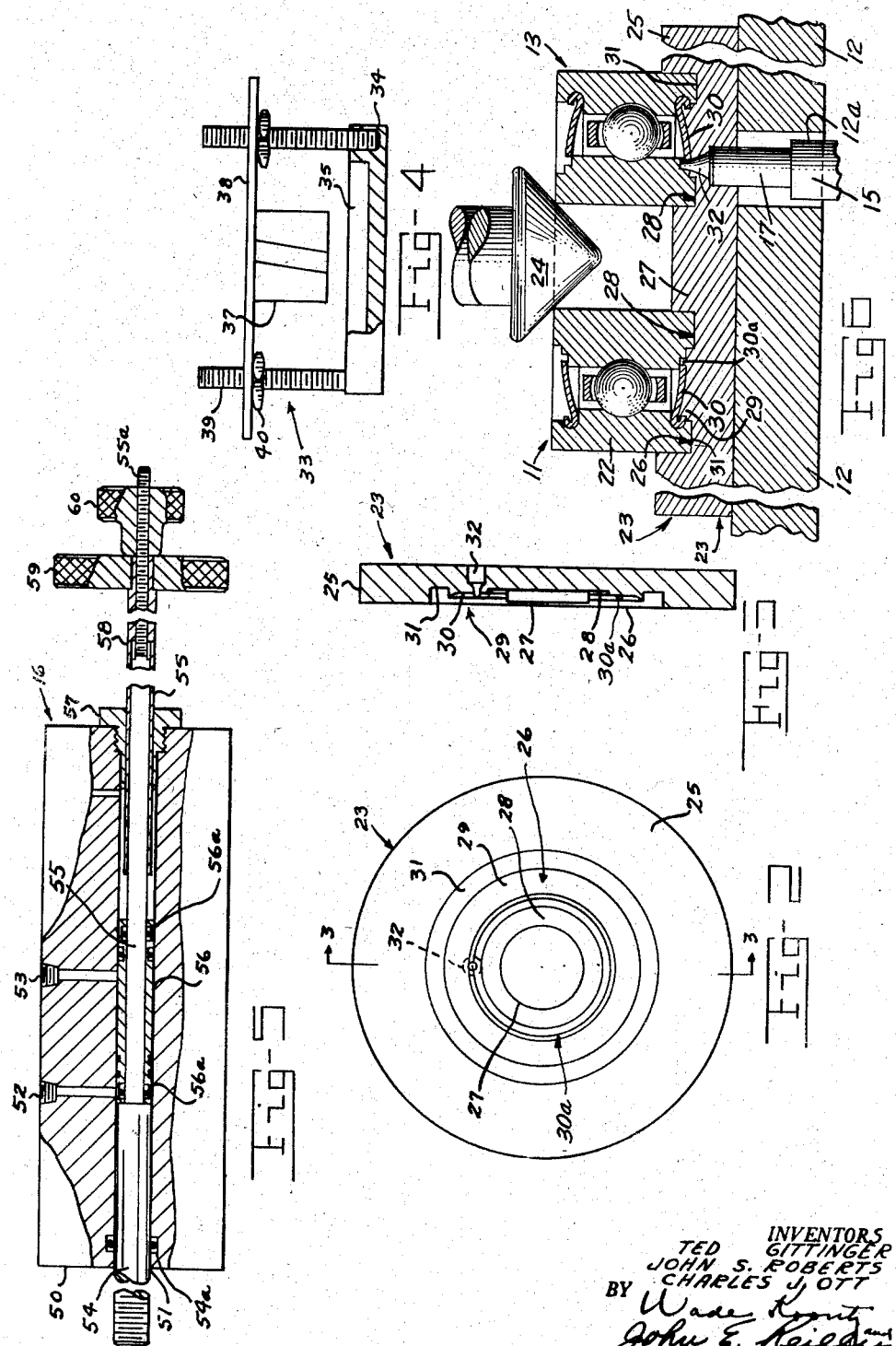
INVENTORS
TED GITTINGER
JOHN S. ROBERTS
CHARLES J. OTT
BY
ATTORNEYS United States Patent Office 2,886,132
Patented May 12, 1959

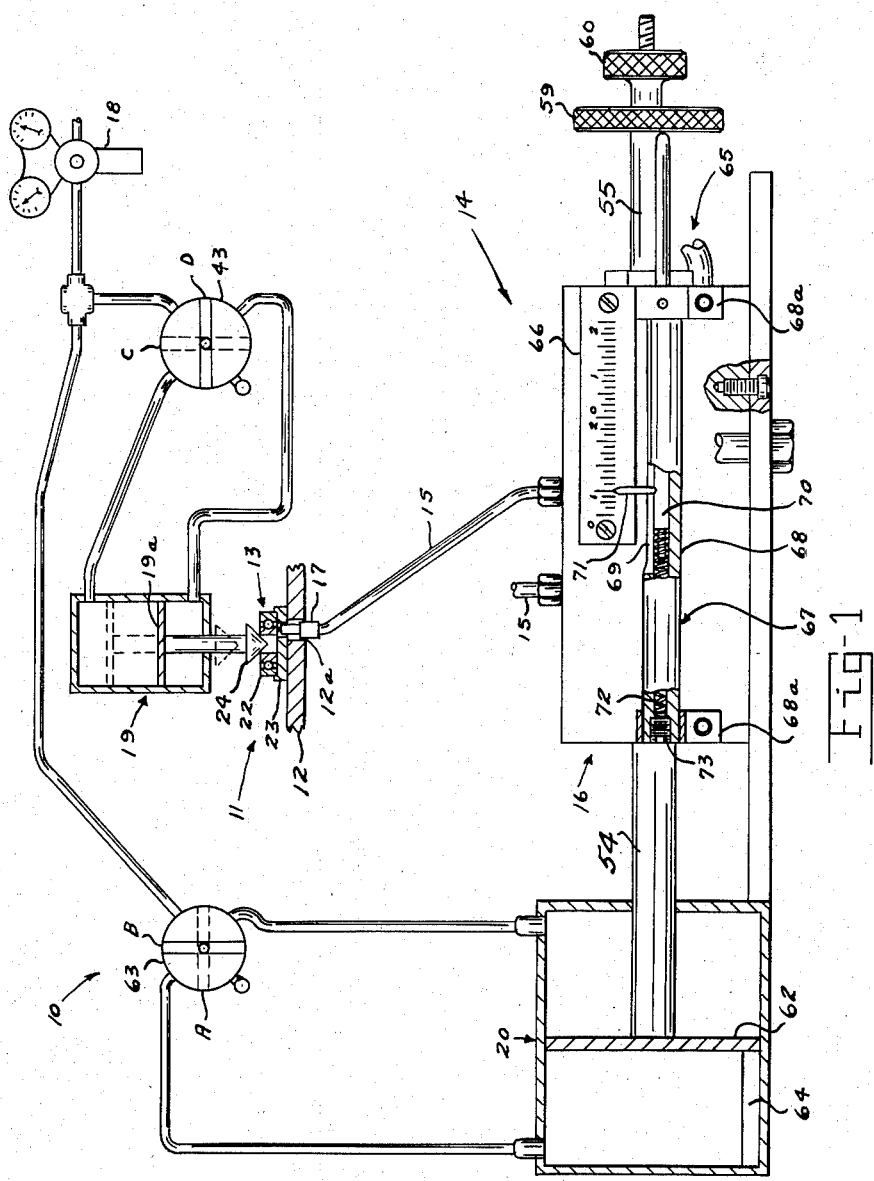

2,886,132

BEARING GREASER ASSEMBLY

Ted Gittinger, John S. Roberts, and Charles J. Ott, San Antonio, Tex.

Application December 13, 1956, Serial No. 628,206

8 Claims. (Cl. 184—1)

(Granted under Title 35, U.S. Code (1952), sec. 266)

The invention described herein may be manufactured and used by or for the United States Government for governmental purposes without payment to us of any royalty thereon.

The present invention relates to an aparatus for the application of lubricant to sealed types of bearings; and, more particularly, relates to a seal-tight grease fitting, the method of making the same, and the cooperation between the fitting and a metering valve to deliver a predetermined amount of grease to the sealed type of bearing.

It is the aim of the present invention to eliminate waste of grease and overlubrication of bearings which in the past have caused broken seals, excessive leakage and a permanent breakdown of the lubricant by excessive working and high temperatures. One common practice, for instance, has been to completely fill the bearing until the grease purges through the seals on the other side. Such practice has resulted not only in the above mentioned disadvantages, but also causes excessive torque and high temperatures, and the grease purged out of the bearing and into the assembly often causes failure of the entire assembly. Previous attempts to purge this grease prior to installation by spinning are not satisfactory, require much time, and do not purge sufficient grease to avoid subsequent purging.

The present invention is designed to obviate the foregoing difficulties by making possible the application of a definitely measured amount of grease through the seals and into the bearing with minimum waste of grease and prevents the purging of excess grease into the assembly during operation.

The present invention also permits faster greasing since it is not necessary to remove large amounts of grease clinging to the bearing which heretofore existed by using present methods and apparatus. The foregoing is accomplished by the provision of a unique and simplified grease fitting construction which forms a seal-tight wall encasing the face of the bearing to be greased, together with a bearing greaser apparatus which cooperates with the fitting to supply a measured amount of grease into the bearing.

An additional purpose of the present invention is to provide a bearing greaser assembly which will apply definitely measured amounts of grease into a sealed type of bearing to prevent excessive torque and high temperatures during operation.

It is a further object to provide a bearing pad which forms a part of the grease fitting having a bearing receiving surface conforming to the contour of the bearing to be greased which will insure the delivery of the measured volume of grease directly into the bearing.

It is a further object to provide a process for making the above bearing pad construction which is simple, requires a minimum number of steps, yet is adaptable for forming an unlimited number of bearing sizes and configurations which will be conformable to the bearings to be greased.

With the above and other objects in view, the preferred form of the present invention consists in the construction, combination and arrangement of the parts hereinafter described in the drawings, in which:

Fig. 1 is a somewhat schematic drawing of the bearing greaser assembly including views in detail of the gage assembly used for the meter valve and the grease fitting arrangement;

Fig. 2 is a top plan view of the bearing pad construction;

Fig. 3 is a side view in section taken along the lines 3—3 of Fig. 2;

Fig. 4 is a side view of the bearing mold assembly used in the bearing pad process, which is partially broken away and sectioned to show the relative disposition of the parts;

Fig. 5 is a side elevation view partially broken away and sectioned of the meter valve assembly; and Fig. 6 is an enlarged cross sectional view in detail to show how the various pad surfaces mate with their respective bearing and grease shield surfaces, particularly the annular space and rib 30a between the shield and the inner race.

Referring more particularly to the drawings there is shown in Fig. 1 a bearing greaser assembly 10 comprised broadly of a bearing mounting assembly 11 consisting of a work table or support surface 12 and a grease fitting 13. Grease supply means 14 accomplishes the delivery of grease into the mounting assembly 11 as seen in Figures 1 and 6 by means of a supply line 15 leading from a grease pump (not shown) into a meter valve assembly 16, and from the valve assembly 16 into a nozzle or nipple portion 17 inserted in the molded assembly. For actuation and control of the bearing mounting assembly 11 and meter valve assembly 16 a compressed air supply meter 18 is provided for operation of a cylinder assembly 19 and cylinder assembly 20 together with suitable regulating means as seen in Figure 1 which will be more particularly described.

The grease fitting 13 is made up essentially of a lower bearing pad 23 as seen in Figures 1 and 6 to accommodate a bearing 22 which is to be greased and an upper cone-shaped pad 24 which is adjustable up and down by means of the cylinder assembly 19 in Figure 1 to center and support the bearing 22 upon the bearing pad 23.

The lower bearing pad 23 consists in a flat circular plate or slab 25 as shown in Figs. 2 and 3 and 6, having a shallow receptacle or bearing receiving aperture or annular channel 26 in which the surface conforms to the contour of the face of the bearing 22 to be greased. The bottom of the receptacle will thus consist, moving concentrically outward, of a central raised portion 27 to project within the inner race of the bearing, a depressed annular space 28 to receive the inner race itself, an annular relatively raised portion 29 defining the clearance space between the inner race and outer race and having an annular curved or dished surface 30 to receive the grease shield with an inner concentric rib 30a raised slightly to fill the clearance space between the inner race and grease shield, followed by an outer depressed portion 31 to accommodate the outer race of the bearing. For injection of the grease into the bearing a grease injector orifice 32 is bored upwardly from the bottom of the pad into the bottom of the receptacle at the raised portion 29 so as to be positioned exactly next to the clearance space between the inner race and grease shield of the bearing. It is to be understood, of course, that the bottom surface of the receptacle can be varied with the configuration of the bearing to be greased and the positioning of the grease orifice 32 can also be changed to conform to the clearance space or desired location of the grease orifice into the bearing.

In the construction of such a pad, it is a primary aim to form the intermediate relatively raised portion 29 so as to fit tightly between the races with the dished surface 30 embracing or contacting the grease shield surface and the annular rib 30a filling the clearance space between the inner race and grease shield. Actually, the central raised portion 27 would not be necessary in that the raised portion 29 combined with the upper cone-shaped pad could properly center and seal the bearing against the lower pad to prevent leakage of grease about the outside of the grease shield and inner race. Unfortunately, to form a pad for the various sizes and configurations of bearings would be expensive and time-consuming, particularly in forming a special pattern for each bearing. Therefore, to form the bearing pad 23, a unique process is provided by which the bearing pad can be made to form a complementary pattern corresponding to the contour of the particular bearing to be greased. To conduct this process, a molding assembly indicated generally at 33 is used as shown in Fig. 4 which consists of a flat cylindrical bearing container 34 having a shallow, cylindrical opening 35 in the top surface thereof to accommodate a metallic alloy, preferably a lead alloy composed of 80% lead, 10% tin and 10% antimony. This alloy is heated in the container by means of a hot plate or other suitable means (not shown) sufficiently to melt the lead. Suspended over the bearing container 35 is a permanent magnet 37 attached to the underside of a horizontal support plate 38 which can be adjustably positioned with respect to the container by means of upstanding studs 39 attached to diametrically opposed sides of the container and nuts 40 threadably positioned on the studs 39.

The molten lead alloy is cast into the desired bearing pad mold by supporting a clean, sealed bearing identical with the bearing to be greased in the molten lead by means of the magnet 37 just deep enough to form a complete contour of one side or face of the bearing. After cooling the mold, a hole is drilled into the mold exactly next to the opening between the inner race and grease shield so as to form the grease injector orifice 32.

The bearing pad mold, upon cooling and boring of the hole, is then ready for use in the greasing operation and is placed on the work surface 12 with the counter bored portion of the grease orifice fitting over the nipple 17 which projects upwardly through a nipple receiving opening 12a in the work table.

To hold and center the bearing 22 in the bearing pad receptacle, the cone-shaped pad 24, which is an extension of a piston assembly 19a, is moved down into the inner race of the bearing by the flow of the compressed air supply into the air cylinder 19, the piston being controlled in movement by a switch or air valve, such as a rotary directional valve 43 as shown in Figure 1. In this way, the cone-shaped pad 44 is adjustable up or down to seal the bearing against the lower pad 23 in order to prevent leakage of grease as it is being forced into the bearing. In selecting a moving force, e.g., the air cylinder 19, for the cone-shaped pad it is, of course, desirable to use one which will be adjustable to different settings but will not require readjustment while one type of bearing is being lubricated.

The meter valve assembly indicated generally at 16, as shown in Fig. 5, is comprised of an elongate valve body 50 of rectangular cross section having a cylindrical fluid passage or chamber 51 extending the length thereof. An intake port 52 and exhaust port 53 are passed transversely into the intermediate portion of the fluid chamber from the top of the valve body in axial, spaced relation, the intake port serving as the inlet from the grease pump into the valve chamber, and the exhaust port as the outlet for conducting grease to the bearing.

Disposed at the intake end of the valve assembly is a plunger or driver piston 54 extending from a point adjacent the intake port 52 outwardly through the intake end of the passage 51 for connection to the air cylinder 20. The plunger 54 is slidably disposed within the fluid passage 51 and is provided with O ring seals or other suitable packing 54a to close the intake end of the chamber. Extending from its connection to the end of the plunger 54 through the fluid passage 51 to an outwardly projecting position at the exhaust end of the valve assembly 16 is a drive shaft or piston rod 55 having a threaded portion 55a at its outer end for attachment of an annular abutment sleeve 58 and an outer locking nut 60. The annular abutment sleeve 58 extends into the exhaust end of the fluid passage 51 through an outer, annular plug or limit stop 57 positioned at the end of the fluid passage 51, the sleeve 58 having a knurled knob 59 at its outer end for threadable adjustment of the sleeve on the drive shaft, the nut 60 acting to lock the sleeve in position.

The piston rod 55 also carries an intermediate, annular sleeve 56 which is slidably disposed between the inner end of the annular abutment 58 and the end of the plunger 54. The sleeve 56 which constitutes a follower piston movable between the end of the plunger 54 and annular abutment 58 is provided at each end with a double row of O ring seals or other suitable packing 56a so as to seal the exhaust port 53 from the fluid passage. In this way, when grease is forced through the intake port 52 the follower piston will be disposed axially until it contacts the inner end of the annular abutment 58, the follower piston and sleeve 58 thus controlling the amount of grease that will flow into the chamber between the end of plunger 54 and follower piston 56.

For displacement of the grease out of the chamber, the air cylinder 20 or other suitable actuating means as seen in Figure 1 is coupled to the outer end of the plunger 54 as shown in Fig. 1. To control the movement of piston 62 of the air cylinder 20, a rotary directional valve 63 is disposed in the compressed air supply line to direct the flow of air to either side of the piston. The air cylinder 20 is applied to the plunger 54 to move the plunger and the grease and the follower piston 56 as seen in Figure 5 toward the exhaust end, since the annular abutment 58 and piston rod 55 are movable with the plunger. The plunger will move along the chamber, closing intake port 52, and will continue to move until the exhaust end of the follower piston moves aginst the limit stop member 57 extending inwardly along the wall of the fluid passage and about the annular abutment 58. As the follower piston is displaced from the end of the annular abutment 58 to the limit stop 57 the exhaust port 53 will be opened, and the plunger 54 will continue to move forcing the grease in the chamber out through the exhaust port, the shaft 55 sliding through the follower piston. After all the grease is forced out of the cylinder the piston is moved back to its starting point by the air cylinder as disclosed in Figure 1, a piston stop member 64 in the air cylinder controlling the return travel of the piston. As the drive piston is returned, the annular abutment engages the follower piston 56 to stop the piston 56 in its original position closing the exhaust port 53. When the plunger 54 reaches its starting point the intake port 52 is again opened and grease will flow into the chamber.

The distance between the inner ends of the plunger and follower piston is indicated by a gage assembly 65, which is shown in Fig. 1. The gage which is mounted on the side of the valve body 50 consists of a scale 66 graduated in eighths of an inch, a quill 67 comprised of an annular shaft 68 extending the length of the valve body and mounted in position under the scale by means of retaining brackets 68a at each end of the shaft, and a pointer assembly disposed in the quill. An elongate slot 69 is provided in the top surface of the shaft 68 extending along the shaft portion under the scale to accommodate a pointer 71. Slidably disposed in the shaft bore is a pointer assembly consisting of a pointer rod 70 extending into the shaft just beyond the slot 69 and projecting outwardly from the shaft to contact the inner surface of the knob 59. Connected to the inner end of the rod 70 is the pointer needle 71 for positioning in the slot 69 to denote the marking on the scale. Any in or out movement of the adjusting knob 59 is followed by the pointer rod 70 by compressing a spring 72 within the annular shaft between the inner end of the pointer rod and a screw 73 provided in the end of the quill. The pointer needle is adjusted to indicate zero on the gage by adjusting the annular abutment 58 on the drive shaft to move the follower piston into contact with the end of the plunger 54. The desired amount of grease to be supplied to the bearing is then determined by adjusting the knob 59 outwardly to obtain the desired setting on the scale. The scale setting will thus indicate the distance from the end of the plunger to the end of the follower piston and multiplied by the annular space between the drive shaft and wall of the chamber would indicate the volume of grease.

To operate the bearing greaser assembly, the desired bearing pad mold 23 is formed as described and placed on the work surface 12. The bearing 22 is then seated on the bearing pad for the lubricating operation. Before adjusting the conical pad 24 on the bearing the compressed air input should be adjusted to provide satisfactory operation of the air cylinders 19 and 20 in Figure 1. The pad 24 is then forced into the inner race to center the bearing 22 on the lower pad 23, by positioning the rotary valve 43 in position D. To obtain the desired grease setting on the scale 66 the knob 59 is adjusted and locked in place by the locking nut 60. The grease pump is operated to fill the supply line between the metering valve and the bearing and the chamber with the desired amount of grease. The valve 63 is then turned to position A to start the piston 62 of the air cylinder 20 to move the grease in the chamber through the exhaust port and supply line nozzle 17 and orifice 32 into bearing 22. The valve 43 is then returned to its closed position C for removal of the bearing 22 from the bearing pad 23, and the valve 63 is returned to position B to force the piston and plunger back to the starting point in order to fill the chamber for greasing the next bearing.

For each bearing operation the meter valve thus co-operates with the grease fittings to apply a definite amount of grease into each bearing, thus accurately controlling the extent to which each bearing is filled to prevent purging, excessive torque and high temperatures, along with an unnecessary waste of grease. The grease fitting, of course, is of particular aid in enabling one to apply a definite amount of grease in that all of the grease is squeezed into the bearing without danger of losing an indeterminate amount about the outside of the bearing. At the same time, the lower bearing pad construction can be utilized in combination with other types of lubricators to insure the accurate supply of grease into the bearing. In addition, the grease supply means, particularly the meter valve assembly is conformable for use in other types of lubrication assemblies.

It is to be further understood that other modifications and changes in the proportion and arrangements of the parts may be made by those skilled in the art without departing from the nature and spirit of the invention, as defined in the following claims.

What is claimed:

1. In a grease fitting for forcing grease into a sealed bearing or the like having a bearing grease shield between its inner and outer races, a bearing pad having a bearing face contour exactly complementary to the side face of the bearing to be greased and a grease injector orifice to register with the opening between the inner race and grease shield, means for forcing the complementary face of said sealed bearing into intimate surface contact with said exact complementary face of said bearing pad and means for introducing a predetermined quantity of grease through said injector orifice into the opening between the race of the bearing and its shield while in said intimate contact.

2. A grease fitting for forcing grease into a sealed bearing or the like, comprising in combination: a lower bearing pad having a shallow receptacle to accommodate a bearing to be greased, the bottom surface of said receptacle including an upstanding ring portion exactly complementary to the contour of the bearing shield between the races so as to define a seal-tight surface engaging fitting with the bearing shield between the race portions thereof, said lower pad further having a grease injector orifice to communicate with the grease receiving space in the bearing between the inner race and the bearing shield when in intimate surface contact with said upstanding ring portion; and an upper bearing pad to center and hold the bearing down in sealed position within said receptacle.

3. A grease fitting for forcing grease into a sealed bearing or the like having an inner and an outer race and an annular grease shield on either side extending from the outer race into contact with the inner race, said grease fitting comprised of a lower bearing pad exactly shaped to seat the bearing to be greased and an upper bearing pad to center and hold the bearing against said lower bearing pad, said lower bearing pad having a bearing receiving receptacle to accommodate the side of the bearing to be greased, the bottom, contacting surface of the receptacle constituting a central raised portion to project within the inner race of the bearing, depressed annular spaces to receive the sides of the inner and outer races, and a relatively raised, annular contoured portion between said annular spaces having a curved surface exactly conforming to the contour of the outer surface of the grease shield between the inner and outer races, the inner edge portion of said curved surface having an annular rib filling the clearance space between the grease shield and inner race, said pad further including a grease injector orifice bored therethrough to communicate with the said clearance space of the bearing for the sealed injection of grease into the bearing and means for forcing a predetermined quantity of grease through said orifice into said sealed bearing through the space between said shield and said inner race.

4. A bearing greaser assembly comprising: a bearing mounting assembly including a support plate, a grease fitting comprised of a lower bearing pad having a bearing receiving surface exactly complementary to the outer side face contour of a sealed type bearing to be greased between the inner and outer races thereof, a grease injector orifice in said pad to communicate with the opening between the shield and the race, and an upper bearing pad adjustable to hold the bearing in seal-tight relation against the bearing receiving surface; grease supply means for forcing a predetermined quantity of grease through said grease injector orifice including a nozzle communicating with said grease orifice; including a metering valve assembly interconnecting said nozzle and grease supply to measure the amount of grease delivered to the bearing to be greased.

5. In a grease fitting for forcing grease into a sealed type bearing member having inner and outer races wherein there is provided grease retainer shield members between the inner and outer races thereof on opposed sides of said bearing, and an annular clearance opening between the shield and the inner race for the injection of grease into said preformed bearing, a bearing pad for seating the bearing to be greased in intimate fitting relation, said pad having a contoured surface exactly conforming to the entire contour of one side of the bearing including the side of the shield and a grease injector orifice passing through said bearing pad to register with the opening between the grease shield and the inner race in the bearing member for the flow of grease into said bearing, and means for forcing the bearing toward said pad to dispose the shield adjacent said pad into intimate contact with said contoured surface.

6. In a grease fitting for forcing grease into a sealed bearing having annular grease shields on opposite sides thereof between the outer and inner races, a bearing pad for seating the bearing to be greased in substantially seal tight relation, said pad having a shallow receptacle to accommodate one side of the bearing, the bottom surface of said receptacle including an upstanding ring portion complementary to the contour of the outer surface of the shield of the bearing between the inner and outer races so as to define a sealed fitting with the bearing between the race portions thereof, said pad further including a grease injector orifice for the direct flow of grease into said bearing between the grease shields and the race portions thereof.

7. A bearing pad for seating a sealed bearing to be greased wherein said sealed bearing includes grease shield members disposed between the inner and outer races thereof and a grease injection space between the inner race and said grease shield members, said bearing pad comprising a bearing receptacle to accommodate one side of said bearing in intimate fitting relation, the bottom surface of said receptacle constituting a central raised portion to project within the inner race of said bearing, depressed annular spaces to receive the sides of the inner and outer races, and a raised annular portion between said annular spaces having a contoured supporting surface conforming exactly to the contour of the entire outer surface of said grease shield member, an annular rib adjacent the inner edge of said raised annular portion filling the grease injection space between said shield member and the inner race, said pad further including a grease injector orifice extending upwardly through the inner edge of said raised annular portion to communicate with said grease injection space for the sealed injection of grease into said bearing between the shields and the inner race.

8. A bearing greaser assembly comprising a horizontal support plate, a bearing supporting pad carried on the upper surface of said support plate, said pad recessed in its upper surface to fit and receive a ball bearing having an inner race, an outer race, and an annular grease shield fixed to the outer race on each side extending from the outer race into contact with the inner race, said pad having an inner annular recess shaped to fit and receive the outer side face of the inner race of the grease shielded ball bearing therein, said pad having an outer annular concentric recess shaped to fit and receive the annular outer race of the ball bearing, said pad having an annular intermedial portion contoured to exactly receive, fit and totally support the entire outer surface of the grease shield between the inner and outer races in contact, said pad having an upwardly projecting annual rib shaped to engage the inner edge of the grease shield and the adjacent contacting surface of the inner bearing race to prevent grease leakage between the inner edge of the grease shield and the inner bearing race when grease is forced into the bearing, said support plate having a grease nozzle receiving bore therein, a grease supply nozzle projecting upwardly from said bore having a grease injector opening through said pad to register through said rib with the space between the inner periphery of the grease shield and said contacting surface of said inner race to deliver grease directly between said grease shield and said inner race, and means connected to said nozzle for delivering a predetermined amount of grease through said grease injector opening into the bearing between the grease shield thereof and the inner ball race thereof.

References Cited in the file of this patent

UNITED STATES PATENTS

| | | |
|---|---|---|
| 2,369,178 | Richmond | Feb. 13, 1945 |
| 2,626,014 | Schmid | Jan. 20, 1953 |
| 2,649,651 | Townhill | Aug. 25, 1953 |
| 2,707,528 | Mulvanity | May 3, 1955 |
| 2,722,047 | Cousino | Nov. 1, 1955 |
| 2,736,392 | Slivar | Feb. 28, 1956 |

FOREIGN PATENTS

| | | |
|---|---|---|
| 742,730 | Germany | Jan. 19, 1944 |